J. M. Baker.
Cultivator.

N° 94,542. Patented Sep. 7, 1869.

Witnesses.
E. Wolff.
Wm A. Morgan.

Inventor.
J. M. Baker.
pr. Munn & Co.
Attorneys.

United States Patent Office.

JOB McNAMEE BAKER, OF FAYETTEVILEE, TEXAS.

Letters Patent No. 94,542, dated September 7, 1869.

IMPROVEMENT IN CULTIVATORS.

The Schedule referred to in these Letters Patent and making part of the same.

*To all whom it may concern:*

Be it known that I, JOB McNAMEE BAKER, of Fayetteville, in the county of Fayette, and State of Texas, have invented a new and useful Improvement in Cultivators; and I do hereby declare that the following is a full, clear, and exact description thereof, which will enable others skilled in the art to make and use the same, reference being had to the accompanying drawings, forming part of this specification.

This invention relates to new and useful improvements in machines for planting and for cultivating the soil, and consists in such a construction and arrangement of parts that the machine is adapted to all the purposes for which planting, cultivating, and ridging-machines are usually employed, as will be hereinafter more fully described.

In the accompanying plate of drawings—

Similar letters of reference indicate corresponding parts.

Figure 1:
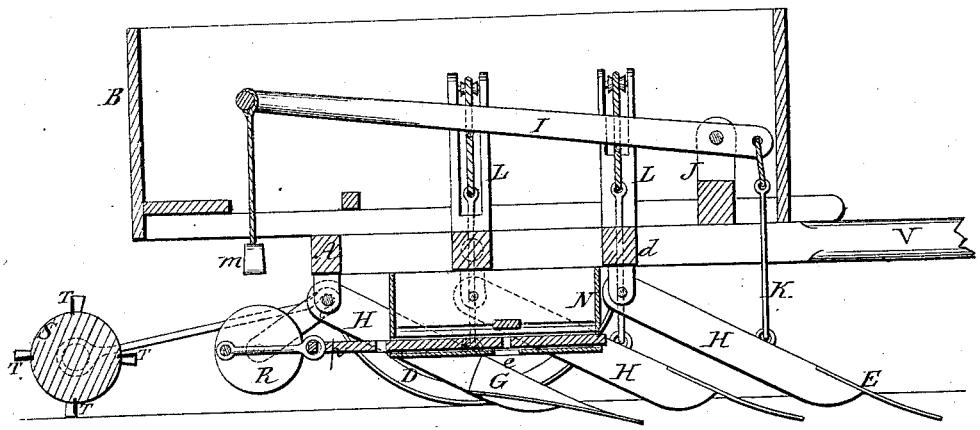
Figure 1 represents a sectional side elevation of the machine, the section being through the line $x\,x$ of fig. 2.
Figure 2:
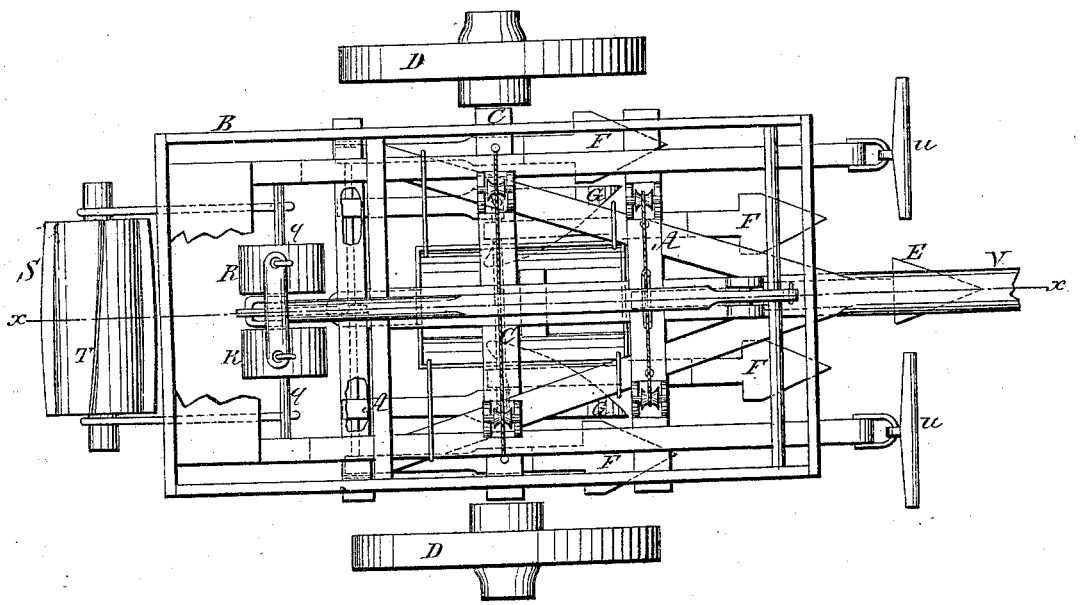
Figure 2 is a top or plan view.

In this machine there are three kinds of cultivator-teeth, designed for different purposes, but operating generally in combination.

A represents the frame of the machine.

B is the box or body on the frame, the whole being supported on the axle C, by two wheels D D.

E is the central or leading plow, or blade.

In the rear of this, on each side, are two shovel-blades, marked F, and between, and in rear of the two hindmost shovel-blades, are two turning or triangular blades, G.

All the blades or plows are attached to beams, H, which are suspended from or jointed to transverse rods, and are made adjustable from the inside of the box B, by means of the lever I.

The fulcrum of this lever is on the post J, and it will be seen that the leading plow, E, is directly connected with the short end of the lever by the rod K.

L represents stands in the box B, with pulleys at their upper ends, over which a cord or chain passes, which is connected with the beams H in such a manner that the blades in rear of the leader E may be governed and adjusted by raising or depressing the lever I.

M is a weight, suspended from the long end of the lever, for steadying and regulating the action of the lever on the beams H.

N is a box, for containing seed to be planted.

O is an orifice in its bottom, for discharging the seed.

The quantity and time of the discharge are controlled by the slide $p$, which is operated by the crank-shaft $q$.

R represents rollers on this crank-shaft, which are designed for covering the seed and smoothing over the ground.

The two triangular turning-blades G are designed for ridging the land for planting cotton-seed, and other similar purposes.

S represents a revolving cylinder, attached to the rear end of the machine by suitable connections, provided with knives attached obliquely to its surface, as seen at T, in the drawing, for cutting stalks on the ground.

This cylinder, or stalk-cutter is to be used as occasion may require, as are also the fixtures for planting, ridging, &c. Any of the parts not required for use may be readily detached and laid aside.

The machine is intended for not only preparing the ground for the seed, but planting the seed and cultivating the plants, forming in itself what I call a "universal cultivator."

The team is attached to the whiffletrees $u\,u$.

V is the tongue.

The advantages to be derived from a machine capable of performing all the necessary service for this purpose in such a compact form are many, and must be obvious to all.

Having thus described my invention,

I claim as new, and desire to secure by Letters Patent—

1. The blades or plows E, F, and G, arranged and operated substantially as and for the purposes herein shown and described.

2. A combined cultivating, ridging, planting, and rolling-machine, arranged and operating substantially as described.

3. In combination with a cultivator, the stalk-cutter S, substantially as described.

4. The method of adjusting the beams H with the blades, substantially as described.

5. The method of operating the slide of the planter, in combination with the rollers R, substantially as described.

The above specification of my invention signed by me, this 26th day of December, 1868.

JOB McNAMEE BAKER.

Witnesses:
F. M. JOHNSON,
J. B. HOLLOWAY.